United States Patent
Bastide et al.

(10) Patent No.: US 9,800,536 B2
(45) Date of Patent: Oct. 24, 2017

(54) AUTOMATED DOCUMENT LIFECYCLE MANAGEMENT

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/639,223

(22) Filed: Mar. 5, 2015

(65) Prior Publication Data

US 2016/0261545 A1  Sep. 8, 2016

(51) Int. Cl.
*G06F 15/16* (2006.01)
*H04L 12/58* (2006.01)
*G06Q 50/00* (2012.01)
*G06Q 10/10* (2012.01)

(52) U.S. Cl.
CPC ............ *H04L 51/32* (2013.01); *G06Q 10/10* (2013.01); *G06Q 50/01* (2013.01); *H04L 51/36* (2013.01)

(58) Field of Classification Search
CPC ......... H04L 51/32; H04L 51/36; G06Q 50/01; G06Q 10/10
USPC ....................................................... 709/204
See application file for complete search history.

(56) References Cited

U.S. PATENT DOCUMENTS

| | | | |
|---|---|---|---|
| 5,841,895 A | 11/1998 | Huffman | |
| 6,212,494 B1 | 4/2001 | Boguraev | |
| 6,263,335 B1 | 7/2001 | Paik et al. | |
| 8,521,661 B2 * | 8/2013 | Wang | G06Q 30/02 706/12 |
| 8,918,447 B2 * | 12/2014 | Frick | G06Q 10/10 709/201 |
| 2006/0288285 A1 | 12/2006 | Lai et al. | |
| 2011/0202430 A1 * | 8/2011 | Narayanan | G06Q 10/10 705/27.1 |
| 2011/0301966 A1 | 12/2011 | Kartoun et al. | |
| 2012/0150935 A1 * | 6/2012 | Frick | G06F 17/30548 709/201 |
| 2013/0275429 A1 | 10/2013 | York et al. | |

(Continued)

FOREIGN PATENT DOCUMENTS

WO   0111492 A1   2/2001
WO   2015036817 A1   3/2015

OTHER PUBLICATIONS

IBM, "Scripts and Languages", http://www-01.ibm.com/software/globalization/topics/languageware/, p. 1.

*Primary Examiner* — Frantz Jean
(74) *Attorney, Agent, or Firm* — Michael A. Petrocelli

(57) ABSTRACT

A method and system for automated content status updating based on analyzing collaboration communications in an electronic social networking environment. Collaboration communications are identified and monitored for a shared content between a plurality of users on an electronic social networking system. Natural language processing (NLP) and analytic analysis are applied to the collaboration communications to determine a state of the shared content. The state can be updated automatically to indicate the state of the shared content in the electronic social networking system.

17 Claims, 2 Drawing Sheets

(56) References Cited

U.S. PATENT DOCUMENTS

| | | | |
|---|---|---|---|
| 2014/0229543 A1* | 8/2014 | Allison | G06Q 10/101 |
| | | | 709/204 |
| 2014/0280463 A1* | 9/2014 | Hunter | G06Q 10/101 |
| | | | 709/203 |
| 2014/0351346 A1* | 11/2014 | Barton | H04L 51/00 |
| | | | 709/206 |
| 2015/0006554 A1 | 1/2015 | Bastide et al. | |
| 2015/0200893 A1 | 7/2015 | Harris et al. | |

* cited by examiner

AUTOMATED DOCUMENT LIFECYCLE MANAGEMENT

BACKGROUND

The present disclosure relates to a method and system for document lifecycle management in an electronic social media environment. Documents can capture knowledge and information for many topics. In one example, documents in academia and enterprises can be created using a process, which can have a life cycle. For example, a group of people can create, review, update and eventually publish a document or enable the final document for downloading. A digital item that can be shared with other users and collaborated on with comments, editing, and opinions, can include, for example, a document, picture, or a web page on the World Wide Web. Additionally, one or more users with access to the document can edit, comment, and resend the document or an updated version of the document, for instance, using an email.

SUMMARY

According to an aspect of the present invention, a method for automated content status updating is based on analyzing collaboration communications in an electronic social networking environment. Collaboration communications are identified and monitored for a shared content between a plurality of users on an electronic social networking system. Natural language processing (NLP) and analytic analysis are applied to the collaboration communications to determine a state of the shared content. The state can be updated automatically the state of the shared content in the electronic social networking system.

According to another aspect of the present invention, a computer program product for automated content status updating is based on analyzing collaboration communications in an electronic social networking environment. The computer program product comprises a computer readable storage medium having program instructions embodied therewith, wherein the computer readable storage medium is not a transitory signal per se, the program instructions executable by a computer to cause the computer to perform a method, comprising: identifying and monitoring collaboration communications for a shared content between a plurality of users on an electronic social networking system; applying natural language processing (NLP) and analytic analysis to the collaboration communications to determine a state of the shared content; and updating automatically the state of the shared content in the electronic social networking system.

In another aspect according to the present invention, a computer system for automated content status updating is based on analyzing collaboration communications in an electronic social networking environment. The computer system includes: one or more computer processors, one or more computer-readable storage media, and program instructions stored on one or more of the computer-readable storage media for execution by at least one of the one or more processors, the program instructions, comprising: identifying and monitoring collaboration communications for a shared content between a plurality of users on an electronic social networking system; applying natural language processing (NLP) and analytic analysis to the collaboration communications to determine a state of the shared content; and updating automatically the state of the shared content in the electronic social networking system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
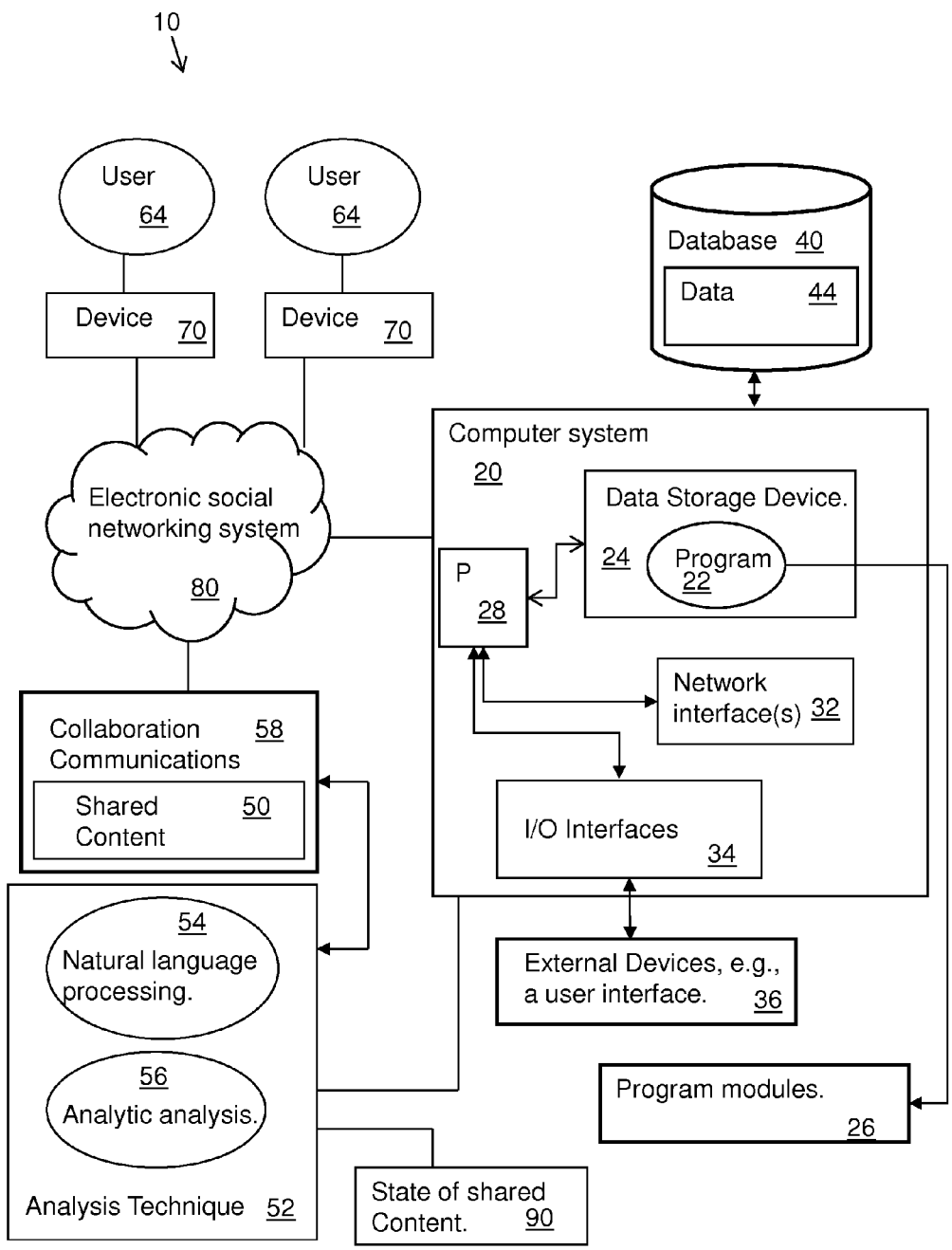
FIG. 1 is a schematic block diagram illustrating an overview of a system and methodology for automated content status updating based on analyzing collaboration communications in an electronic social networking environment according to an embodiment of the disclosure.
Figure 2:
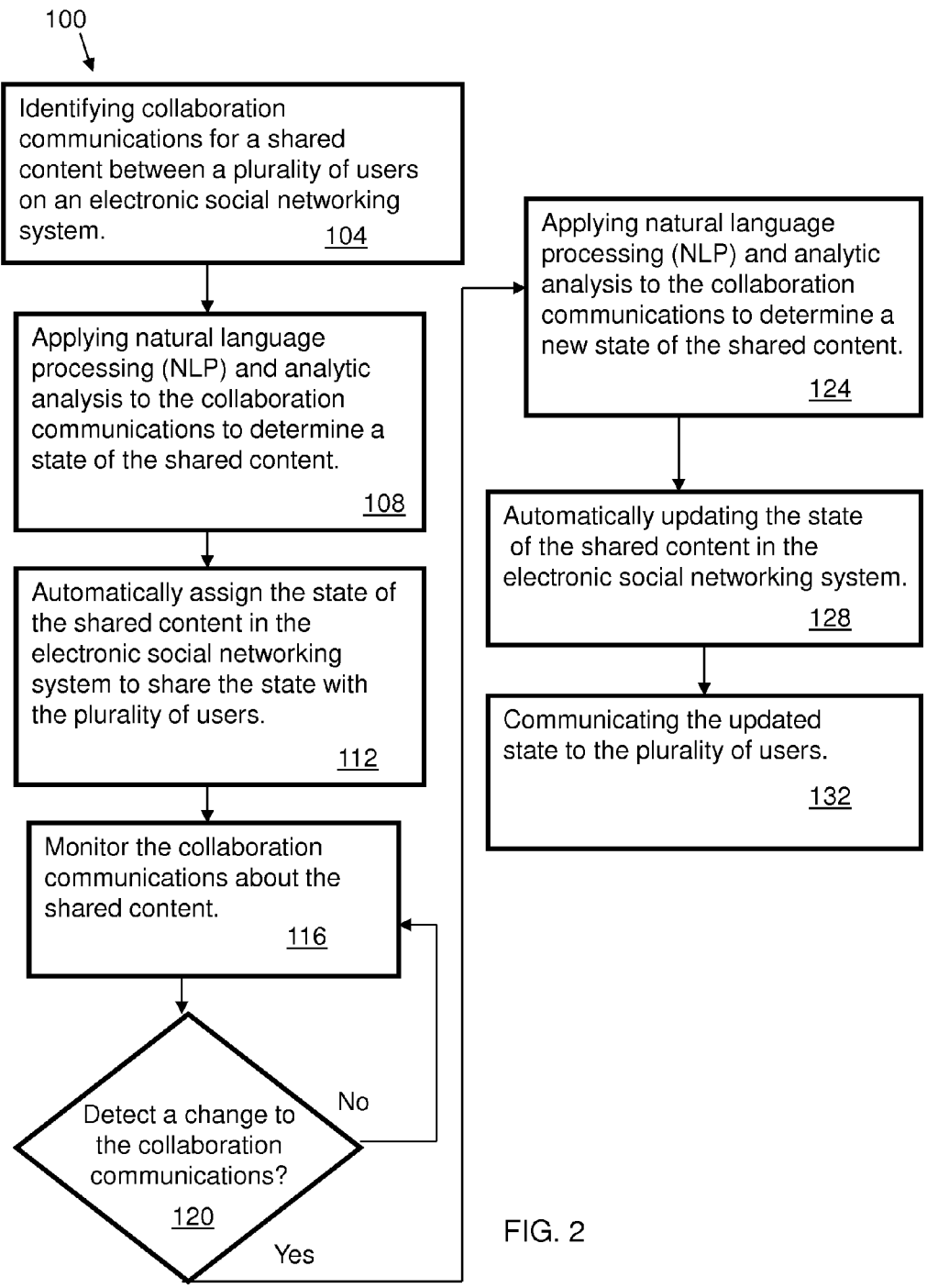
FIG. 2 is a flow chart illustrating a method for automated content status updating based on analyzing collaboration communications in an electronic social networking environment based on FIG. 1, according to an embodiment of the disclosure.

Referring to FIGS. 1 and 2, a system 10 and method 100 for automated content status updating based on analyzing collaboration communications in an electronic social networking environment is discussed. The method 100 identifies collaboration communications 58 for a shared content 50 between a plurality of users 64 on a communications system such as an electronic social networking system 80, as in block 104 (FIG. 2). In one example, the content can be uploaded or sent to a shared resource from one of the users 64 using the device 70.

The users 64 may use a device 70 to access the electronic social networking system to post shared content 50 and to engage in collaboration communications 58 about the shared content. The devices 70 are a generic representation for a plurality of user devices, for example, a computer, or a Personal Data Assistant (PDA), a cell phone, a notebook, a laptop, a tablet, or the like. The devices 70 are configured to send and receive electronic communications. The computer system 20 is a generic representation of a computer which may be embodied in a communications device such as a computer, or a hand held device, or can also represent a server for providing the method as a service which can be accessible using the Internet or a network.

The system 10 and method 100 include analyzing the collaboration communications 58 regarding the shared content 50 using an analysis technique 52. The analysis technique 52 can include applying natural language processing (NLP) 54 and analytic analysis 56 to the collaboration communications 58 about the shared content 50 to determine a state 90 of the shared content, as in block 108. For example, the collaboration communication, such as comments about the shared content can be monitored. The shared content can be analyzed using NLP to search for words such as "draft", "update", or "final". The collaboration communications can also be analyzed to determine, for example, a first communication, dates of further communications, and the origin of the communications. An initial state can be determined from the NPL and analytic analysis, for example, the shared content and collaboration communications can be determined to be in a draft state and can be labeled to indicate the draft state of the shared content. Subcategories can also be used such as first, second or third, etc., to describe the draft state. The state of the shared content can also include an indication that the document is current and/or when it was last edited or revised. For example, the state can indicate that the shared content is current, or the latest version, and can number the version. The method automatically assigns the state 90 of the shared content in the electronic social networking system 80 such that the state 90 is communicated and available to all the users 64, as in block 112. For example, the state can be posted or communicated as "draft", and can further be specified as a draft with a specific date to indicate its recentness.

The method 100 monitors the collaboration communications about the shared content, as in block 116. If the method does not detect a change to the collaboration communications (block 120) the method continues to monitor the collaboration communication in block 116. If the method detects a change to the collaboration communications (block 120), the method continues to block 124. Block 124 includes applying natural language processing (NPL) 54 and analytic analysis 56 to the collaboration communications 58 to determine a new state 90 of the shared content 50.

The method automatically updates the state 90 of the shared content in the electronic social networking system 80, as in block 128. For example, the state can be posted or communicated as "updated", and can further include the date of the update to indicate its recentness. The new state 90 can be communicated and available to all the users 64, as in block 132.

The method of the present disclosure can enhance document life-cycle management of the shared content (e.g., a document) by monitoring collaboration communications such as comments, and metadata regarding shared content and identifying the state of the shared content. The state of the shared content can correspond or define a phase of the life-cycle of the shared content. The method and system of the present disclosure can ensure that a user uses the current version of the shared content, and that all users are communicated an updated state of the shared content.

The state of the shared content can be designated in many ways. Designations can include, for example: Alpha, Beta, draft, review, final, release, expire, or the like. Designations can be applied, changed, and reapplied as needed based on the status of the shared content.

The method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program.

Further, the NLP and the analytic analysis can be applied to the shared content to determine the state of the shared content in addition to application to collaboration communications. The shared content can be analyzed for date and time of content changes or replacement, in addition to monitoring the collaboration communication of the shared content. Both the shared content and the collaboration communication can be analyzed as in block 108 (FIG. 2) to determine a state of the shared content, and update the state.

In one example, an analytic analysis can be used to determine a life cycle of shared content based on the context of the discussion. Also, external sources to the discussion can define phases (or one or more states) of a lifecycle (for example, storyboards, milestones, or other sources that contain phase definitions or declarations). The context of the discussion and other sources external to the discussion can be used to generate a model of language that describes each phase of the lifecycle. For example, specified language can be defined as corresponding to a certain phase of a lifecycle. Using the method and system of the present disclosure, identification of the specified language can initiate defining the shared content as in a specific phase (or state) of a lifecycle. In one example, a user can forward a document and refer and/or label the document as a draft. The method and system of the present disclosure can determine and indicate that the document is in a draft phase.

The collaboration communications can be outside the shared content and refer to the shared content, for example, posts, or emails with the shared content as an attachment or referring to the shared content. Additionally, the collaboration communications can be within the shared content, for example, comments or notes in the shared content. For example, the shared content can be a document with comments (as collaboration communications) in the document using a comment function of a word processing software application. Identification of the comments or collaboration communications can be accomplished by detecting and analyzing new comments, and/or by shared content comparison, such as a document comparison.

The shared content may include: a document, a file, a shared web (World Wide Web) application, an html (HyperText Markup Language) website page, a picture, a video, or an audio recording, or the like.

The social networking environment can be an electronic social networking system, for example, a document management facility, a social networking site, a shared repository, a dropbox, or an email, or instant messaging, or the like.

In one example, the state can use lifecycle designations to describe the shared content's state over a time period. The designation can include: Alpha, Beta, GA (General Availability), and the like. Alternative designations can include: draft, review, final, release, or expire, to designate a life cycle. Users of the shared content can include all with access to the shared content, or those with administrative privileges, or required access privileges. The state of the shared content can be communicated to a plurality of users as a group, or community.

Other considerations for determining a state can include a period of time shared content has been available for collaboration or comment. For example, the state of shared content can be updated after a period of time has passed to indicate a specified period of time has lapsed without edits or comments.

An indication of the state of the shared content can also include a confidence level regarding the indicated state. For instance, the confidence level can indicate a level of assurance that the indicated state is accurate. Such an assessment can be derived from, for instance, the quantity of comments, or the specificity of comments, such as referring to a first draft, a draft, or updates to conclude that the shared content is indicated as a draft or an updated draft.

The method includes changing the state of the shared content, communicating the state change to the users, which can include actively notifying the users or passively updating an indication of the state on a shared resource associated with the shared content, e.g., an indicator, a banner, a dialog box, or the like. The old collaborations communications (e.g., comments) can be noted as expired and are not used in future decisions or determinations of the state of the shared content.

In one example described below according to an embodiment of the disclosure, shared content can be a shared document. A primary user can set up a document lifecycle as draft, review and publish. A user communicates that the document "needs work". The document can be labeled as "draft". When another user edits the document the primary user posts "thanks for the edits". The state of the document is then updated to "review". Another post can read "great job", which indicates that the review process has concluded. The state can then be updated to "publish". In the above example, the method according to the present disclosure determines that a new comment is posted, and can indicate or mark the comment as used or analyzed. The method also ascertains that a comment has been posted, and analyzes the comment to initiate a change in the state. The method may conclude that the comment has no affinity to a state, and leaves the state unchanged. An example of such comments may be, "are we good?", or "what do you think?". Based on other comments or communications, the method can conclude a state change is warranted, and indicate a state change which can be communicated to the users.

Additionally a user, or system based, time threshold can be used to trigger a state change. For example, after 6 months a document can be considered expired, or users can be notified to review the document, and the current state communicated to the users.

The present disclosure enables management of exchanges of information between parties regarding shared content. The present disclosure enables tracking of status of shared content, version control of the shared content, tracking of participation in collaboration communications, and progress to a desired outcome.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for automated content status updating based on analyzing collaboration communications in an electronic social networking environment, comprising:
    identifying and monitoring collaboration communications for a shared content between a pluralities of users on an electronic social networking system, the collaboration communications being within the shared content, or outside the shared content and refer to the shared content;
    applying natural language processing (NLP) and analytic analysis to the collaboration communications to determine a state of the shared content;
    updating automatically the state of the shared content in the electronic social networking system, resulting in a plurality of states identifying the shared content over a period of time, the plurality of states being determined by the application of the natural language processing (NLP) and the analytic analysis to the collaboration communications of the shared content; and
    determining a confidence level in the state, the confidence level being based on the collaboration communications for the shared content.

2. The method of claim 1, wherein the shared content includes: a document, a file, a shared web (World Wide Web) application, an html (HyperText Markup Language) website page, a picture, a video, or an audio recording.

3. The method of claim 1, wherein the social networking environment includes a document management facility, a social networking site, a shared repository, a dropbox, or an email.

4. The method of claim 1, wherein the state defines a phase of a lifecycle management of the shared content.

5. The method of claim 1, wherein the state includes a designation of: Alpha, Beta, GA (General Availability), draft, review, final, release, or expire.

6. The method of claim 1, wherein the confidence level indicates a level of assurance of the state being accurate, and the confidence level being based on one or more factors selected from a group consisting of: a quantity of comments; and a specificity of comments including a reference to a state of a draft.

7. The method of claim 1, wherein the state is further determined based on a period of time the shared content is available for collaboration; and the method further comprising:
    updating the state of the shared content after the period of time has elapsed to indicate the period of time has lapsed without the collaboration communications, in response to the monitoring of the collaboration communications having no collaborative communications about the shared content for the period of time.

8. The method of claim 1, wherein the state is further determined based on a period of time the shared content is available for collaboration; and the method further comprising:
    updating the state of the shared content after the period of time has elapsed to indicate the shared content has expired;
    notifying the plurality of users that the shared content has the indication of expired, and
    notifying the plurality of users to review the shared content.

9. A computer program product for automated content status updating based on analyzing collaboration communications in an electronic social networking environment, the computer program product comprising a computer readable storage medium having program instructions embodied therewith, wherein the computer readable storage medium is not a transitory signal per se, the program instructions executable by a computer to cause the computer to perform a method, comprising:
    identifying and monitoring collaboration communications, by the computer, for a shared content between a plurality of users on an electronic social networking system, the collaboration communications being within the shared content, or outside the shared content and refer to the shared content;

applying natural language processing (NLP) and analytic analysis, by the computer, to the collaboration communications to determine a state of the shared content;

updating automatically the state of the shared content, by the computer, in the electronic social networking system, resulting in a plurality of states identifying the shared content over a period of time, the plurality of states being determined by the application of the natural language processing (NLP) and the analytic analysis to the collaboration communications of the shared content; and determining a confidence level in the state, the confidence level being based on the collaboration communications for the shared content.

10. The computer program product of claim 9, wherein the shared content includes: a document, a file, a shared web (World Wide Web) application, an html (HyperText Markup Language) website page, a picture, a video, or an audio recording.

11. The computer program product of claim 9, wherein the social networking environment includes a document management facility, a social networking site, a shared repository, a dropbox, or an email.

12. The computer program product of claim 9, wherein the state defines a phase of a lifecycle management of the shared content.

13. The computer program product of claim 9, wherein the state includes a designation of: Alpha, Beta, GA (General Availability), draft, review, final, release, and expire.

14. A computer system for automated content status updating based on analyzing collaboration communications in an electronic social networking environment, the computer system comprising:

one or more computer processors, one or more computer-readable storage media, and program instructions stored on one or more of the computer-readable storage media for execution by at least one of the one or more processors, the program instructions, comprising:

identifying and monitoring collaboration communications for a shared content between a plurality of users on an electronic social networking system, the collaboration communications being within the shared content, or outside the shared content and refer to the shared content;

applying natural language processing (NLP) and analytic analysis to the collaboration communications to determine a state of the shared content;

updating automatically the state of the shared content in the electronic social networking system, resulting in a plurality of states identifying the shared content over a period of time, the plurality of states being determined by the application of the natural language processing (NLP) and the analytic analysis to the collaboration communications of the shared content; and determining a confidence level in the state, the confidence level being based on the collaboration communications for the shared content.

15. The system of claim 14, wherein the shared content includes: a document, a file, a shared web (World Wide Web) application, an html (HyperText Markup Language) website page, a picture, a video, or an audio recording.

16. The system of claim 14, wherein the social networking environment includes a document management facility, a social networking site, a shared repository, a dropbox, or an email.

17. The system of claim 14, wherein the state defines a phase of a lifecycle management of the shared content.

* * * * *